(12) United States Patent
Machida et al.

(10) Patent No.: US 10,781,572 B2
(45) Date of Patent: Sep. 22, 2020

(54) WORKING MACHINE

(71) Applicant: Komatsu Ltd., Minato-ku, Tokyo (JP)

(72) Inventors: Masaomi Machida, Hiratsuka (JP); Takeshi Kurihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/561,136

(22) PCT Filed: Mar. 9, 2016

(86) PCT No.: PCT/JP2016/057362
§ 371 (c)(1),
(2) Date: Sep. 25, 2017

(87) PCT Pub. No.: WO2016/158265
PCT Pub. Date: Oct. 6, 2016

(65) Prior Publication Data
US 2018/0044893 A1     Feb. 15, 2018

(30) Foreign Application Priority Data
Mar. 31, 2015    (JP) .................................. 2015-074059

(51) Int. Cl.
*H04N 5/00*      (2011.01)
*E02F 9/26*      (2006.01)
(Continued)

(52) U.S. Cl.
CPC .................. *E02F 9/26* (2013.01); *B60R 1/00* (2013.01); *E02F 9/261* (2013.01); *G01S 13/04* (2013.01);
(Continued)

(58) Field of Classification Search
CPC ... H04N 7/00; H04N 5/00; B60R 1/00; G06T 11/60
See application file for complete search history.

(56) References Cited

U.S. PATENT DOCUMENTS 6,327,522 B1 * 12/2001 Kojima .................. B60K 35/00
                                               348/115
2008/0068520 A1 * 3/2008 Minikey, Jr. ............. B60R 1/12
                                               349/11
(Continued)

FOREIGN PATENT DOCUMENTS

| CN | 103797789 | 5/2014 |
|---|---|---|
| JP | 2001076298 | 3/2001 |

(Continued)

OTHER PUBLICATIONS

International Search Report and Written Opinion in International Application No. PCT/JP2016/057362, dated May 31, 2016, 11 pages, with English translation.

(Continued)

*Primary Examiner* — Maryam A Nasri
(74) *Attorney, Agent, or Firm* — Fish & Richardson P.C.

(57) ABSTRACT

A work machine includes plural cameras, a display unit and a controller controlling the cameras and the display unit. The controller includes an overview image generator generating an overview image from the images by the cameras, an image superimposing unit superimposing a top view image of the work machine on the overview image, a working-equipment display unit putting a part of working equipment in the top view image of the work machine in non- or transparent-display, and an operation judging unit judging at least one of operation of the working equipment and travel of the work machine. When the operation judging unit judges the operation of the working equipment etc. is performed, the working-equipment display unit displays the top view image of the work machine without displaying at least one part of the working equipment or with transparently displaying the at least one part of the working equipment.

14 Claims, 17 Drawing Sheets

(51) Int. Cl.
  H04N 5/247 (2006.01)
  G01S 13/04 (2006.01)
  B60R 1/00 (2006.01)
  H04N 5/272 (2006.01)
  H04N 7/18 (2006.01)
  G01S 13/931 (2020.01)
  G01S 13/87 (2006.01)
  E02F 3/32 (2006.01)
  G01S 13/86 (2006.01)

(52) U.S. Cl.
  CPC ............ H04N 5/247 (2013.01); H04N 5/272 (2013.01); H04N 7/181 (2013.01); B60R 2300/105 (2013.01); B60R 2300/303 (2013.01); E02F 3/32 (2013.01); G01S 13/867 (2013.01); G01S 13/87 (2013.01); G01S 13/931 (2013.01); G01S 2013/93271 (2020.01); G01S 2013/93272 (2020.01); G01S 2013/93274 (2020.01)

(56) References Cited

U.S. PATENT DOCUMENTS

| | | | |
|---|---|---|---|
| 2009/0128630 A1* | 5/2009 | Kanaoka | ............ H04N 5/23238 348/148 |
| 2013/0182066 A1 | 7/2013 | Ishimoto | |
| 2014/0354813 A1* | 12/2014 | Ishimoto | ................ H04N 7/181 348/148 |
| 2015/0138360 A1 | 5/2015 | Kowatari et al. | |
| 2015/0222858 A1 | 8/2015 | Tanuki et al. | |

FOREIGN PATENT DOCUMENTS

| | | |
|---|---|---|
| JP | 2008-248613 | 10/2008 |
| JP | 2010-059653 | 3/2010 |
| JP | 2010-198519 | 9/2010 |
| JP | 2012-074929 | 4/2012 |
| JP | 2013-239873 | 11/2013 |
| JP | 2013-253402 | 12/2013 |
| JP | 2013253402 A * | 12/2013 |
| JP | 2014-064209 | 4/2014 |

OTHER PUBLICATIONS

International Preliminary Report on Patentability in International Application No. PCT/2016/057362, dated Oct. 3, 2017, 7 pages (with English translation).
Japanese Office Action in Japanese Application No. 2017509476, dated Jun. 25, 2019, 5 pages (with English translation).
Chinese Office Action in Chinese Application No. 201680018051.4, dated Jan. 30, 2019, 16 pages, with English Translation.

* cited by examiner

WORKING MACHINE

CROSS-REFERENCE TO RELATED APPLICATIONS

This application claims priority to International Application No. PCT/JP2016/057362 filed on Mar. 9, 2016, which claims priority to Japanese Application No. 2015-074059, filed Mar. 31, 2015, the contents of each are incorporated herein in their entirety.

TECHNICAL FIELD

The present invention relates to a work machine including working equipment.

BACKGROUND ART

A work machine such as a hydraulic excavator used in a mine operation is considerably larger than a work machine used in a typical construction site and the like and has been developed for more efficient operation of digging and the like using a large-volume bucket according to a size of the work machine.

The hydraulic excavator exemplifying the work machine including such working equipment typically includes a cab on a front-left-top portion of an upper revolving body.

Since regions such as a front bottom, a right side and a rear side of the upper revolving body are poorly visible from the setting position of the cab, many mirrors are disposed near the cab. However, since the mirrors themselves are small, at the time of a rotational operation, an operator needs to pay attention to avoiding collision of a portion surrounding a counterweight on the rear portion of the upper revolving body and working equipment (e.g., a boom, an arm and a bucket) on a front portion of the work machine against an obstacle.

Accordingly, there has been typically known a technology for an operator to perform a rotational operation of the upper revolving body while checking surrounding conditions of the upper revolving body using a monitor provided inside the cab, the monitor displaying the overview image generated from images taken by the cameras attached to a vehicle body of the work machine (see, for instance, Patent Literature 1).

CITATION LIST

Patent Literature(s)

Patent Literature 1: JP2013-253402A

SUMMARY OF THE INVENTION

Problem(s) to be Solved by the Invention

However, since it is difficult to recognize which direction of the overview image displayed on the monitor indicates a direction in which the working equipment works, an image enabling the operator to recognize where the working equipment is present on the monitor has been desired.

On the other hand, in the technology described in Patent Literature 1, in order that the operator can easily recognize the direction of the hydraulic excavator and a position of the hydraulic excavator on the overview image, an image data of the hydraulic excavator is superimposed on the overview image generated by the images taken by the cameras. However, since the image data of the hydraulic excavator covers a forward protruding portion of the working equipment, it is difficult to recognize an obstacle and the like located under the working equipment on the monitor.

An object of the invention is to provide a work machine enabling an operator to easily check an obstacle located under working equipment and to easily recognize a direction in which the working equipment works.

Means for Solving the Problem(s)

According to a first aspect of the invention, a work machine includes: working equipment; a plurality of cameras configured to take images of surroundings of the work machine; a display unit configured to display the images taken by the plurality of cameras; and a controller configured to control the plurality of cameras and the display unit, in which at least one of the plurality of cameras is capable of taking an image under the working equipment, the controller includes: an overview image generator configured to generate an overview image based on the images taken by the plurality of cameras; an image superimposing unit configured to superimpose a top view image of the work machine on the overview image generated by the overview image generator; a working-equipment display unit configured to display the top view image of the work machine without displaying at least one part of the working equipment or with transparently displaying the at least one part of the working equipment; and an operation judging unit configured to judge at least one of an operation of the working equipment and a travel operation of the work machine, in which the controller controls the display unit to display the overview image on which the top view image of the work machine is superimposed, and when the operation judging unit judges that at least one of the operation of the working equipment and the travel operation of the work machine is performed, or that at least one of the operation of the working equipment and the travel operation of the work machine is stopped, the working-equipment display unit is configured to display the top view image of the work machine without displaying at least one part of the working equipment, with transparently displaying the at least one part of the working equipment, or with fully displaying the working equipment.

According to the first aspect of the invention, since the working-equipment display unit is provided, the top view image can be displayed without displaying at least one part of the working equipment or with transparently displaying the working equipment. Accordingly, a region under the working equipment can be displayed on the overview image, so that the operator can easily recognize an obstacle and the like under the working equipment.

Moreover, since the working equipment can also be displayed on the overview image by disabling the working-equipment display unit, the operator can easily recognize a position of the working equipment on the overview image and a working direction of the working equipment when the operator wants to find the position of the working equipment and the direction of the working equipment on the overview image.

Further, since the top view image can be displayed without displaying at least one part of the working equipment or with transparently displaying the working equipment when the operator operates the working equipment or travels the work machine, the operator can safely operate the working equipment while checking conditions under the working equipment.

In addition, when the operation judging unit judges that at least one of the operation of the working equipment and the travel operation of the work machine is performed, or that at least one of the operation of the working equipment and the travel operation of the work machine is stopped, the working-equipment display unit displays a part of at least one of the working equipment and the work machine, so that the operator can immediately understand which direction the work machine currently faces.

In the work machine according to a second aspect of the invention, the working-equipment display unit displays an outline of the working equipment in the top view image of the work machine on the overview image on which the top view image of the work machine is superimposed.

According to the second aspect of the invention, since the outline of the working equipment is displayed even when the working equipment and the like are not displayed, the operator can understand which direction the work machine currently faces even though the working equipment and the like are not displayed in the top view image.

In the work machine according to a third aspect of the invention, at least one of the plurality of cameras is capable of taking an image under a main body of the work machine, the working-equipment display unit displays the top view image of the work machine without displaying at least one part of the main body of the work machine or with transparently displaying the at least one part of the main body of the work machine, in addition to the at least one part of the working equipment.

According to the third aspect of the invention, in addition to the region under the working equipment, a region under the main body of the work machine can be displayed on the overview image, so that the operator can easily recognize an obstacle and the like under the work machine.

According to a fourth aspect of the invention, a work machine includes: working equipment; a surroundings monitor radar configured to monitor surroundings of the work machine; a plurality of cameras configured to take images of surroundings of the work machine; a display unit configured to display the images taken by the plurality of cameras; and a controller configured to control the plurality of cameras and the display unit, in which at least one of the plurality of cameras is capable of taking an image under the working equipment, the controller includes: an overview image generator configured to generate an overview image based on the images taken by the plurality of cameras; an image superimposing unit configured to superimpose a top view image of the work machine on the overview image generated by the overview image generator; a working-equipment display unit configured to display the top view image of the work machine without displaying at least one part of the working equipment or with transparently displaying the at least one part of the working equipment; and a radar state judging unit configured to judge presence or absence of an obstacle in surroundings of the work machine based on a signal from the surroundings monitor radar, in which the controller controls the display unit to display the overview image on which the top view image of the work machine is superimposed, and when the radar state judging unit judges that the obstacle is detected, the working-equipment display unit displays the top view image of the work machine without displaying at least one part close to the obstacle of the working equipment or with transparently displaying the at least one part of the working equipment.

According to the fourth aspect of the invention, when the radar state judging unit judges that the obstacle is detected, at least one part close to the obstacle of the working equipment is not displayed or is transparently displayed, so that the operator can easily confirm the obstacle on the top view image.

BRIEF DESCRIPTION OF DRAWING(S)

DESCRIPTION OF EMBODIMENT(S)

[1] Overall Structure of Working Machine

Figure 1:
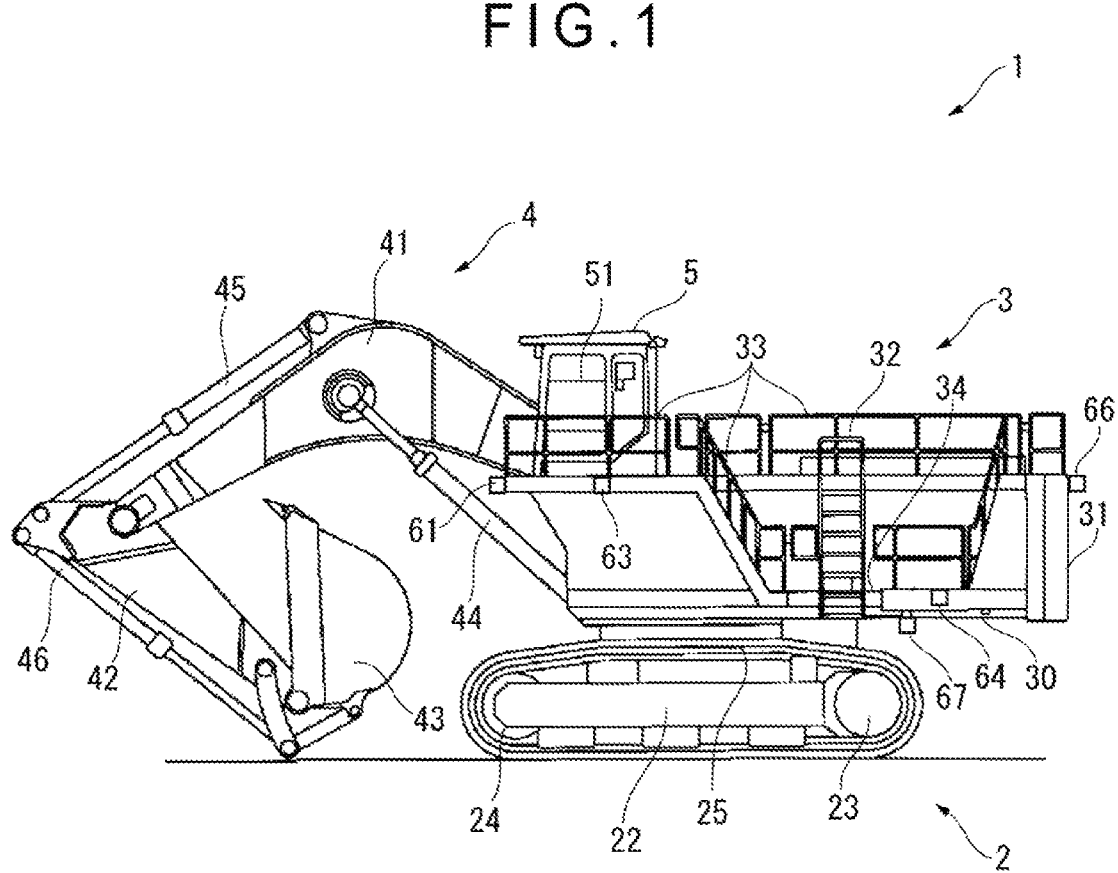
FIG. 1 is a side view of a work machine including an upper revolving body according to an exemplary embodiment of the invention.
Figure 2:
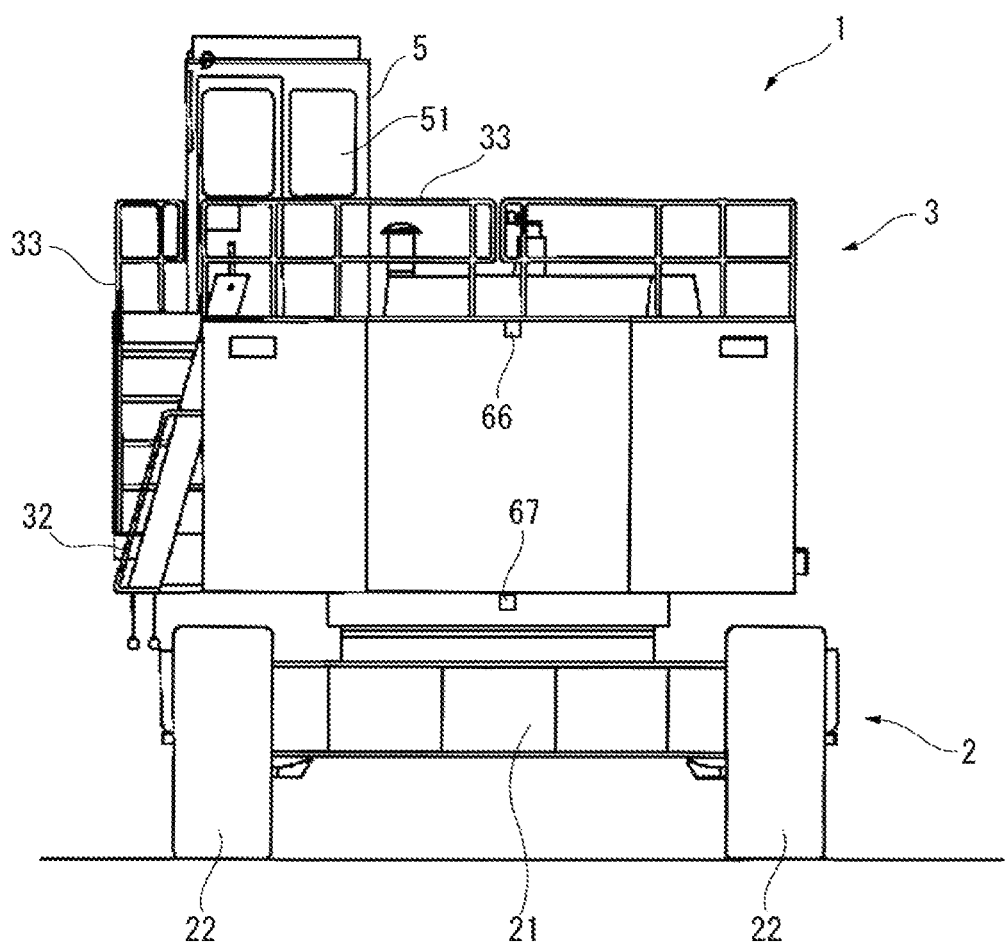
FIG. 2 is a rear view of the work machine including the upper revolving body according to the above exemplary embodiment.
Figure 3:
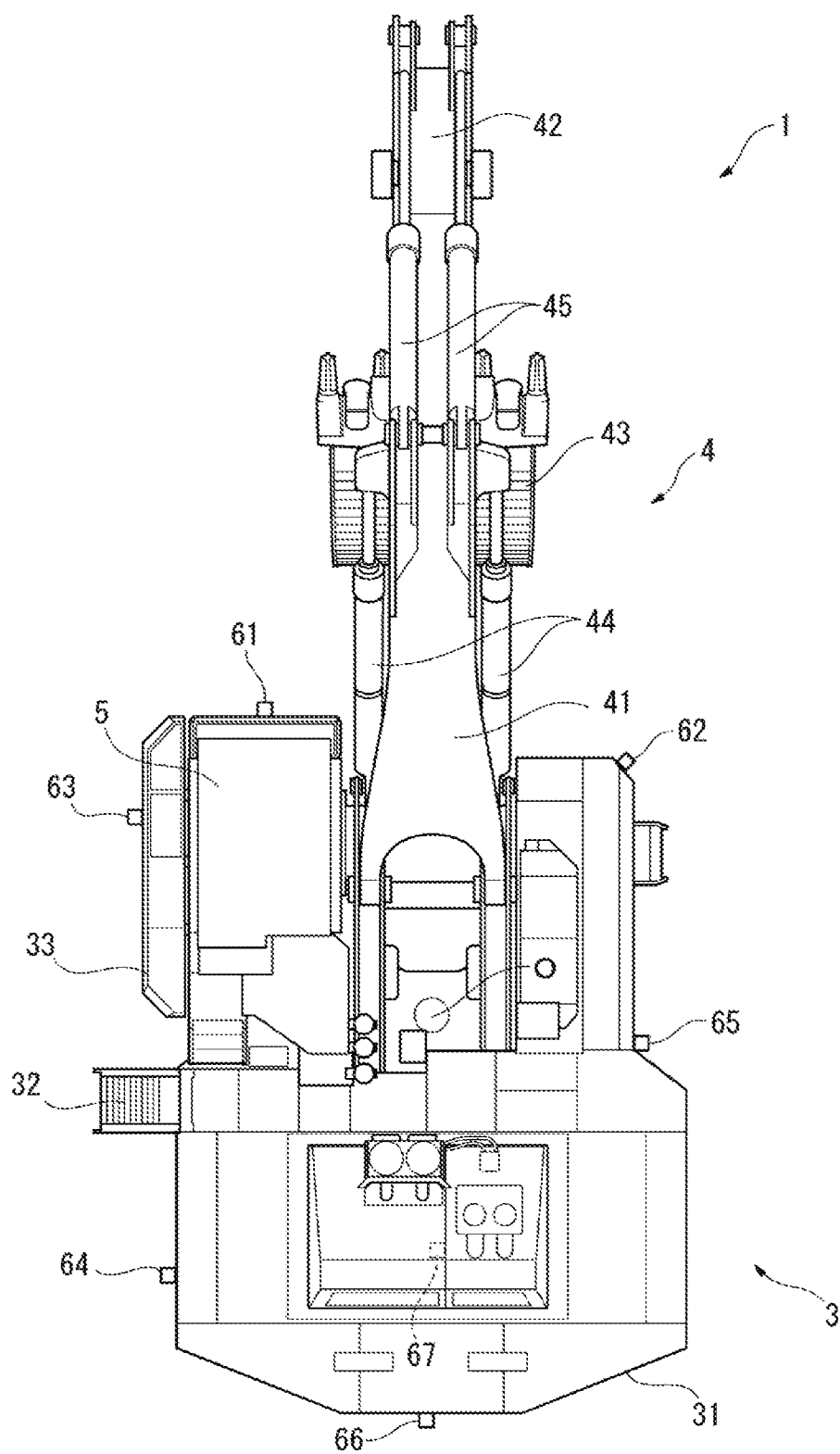
FIG. 3 is a plan view of the work machine including the upper revolving body according to the above exemplary embodiment.

FIGS. 1 to 3 each show a work machine including working equipment according to an exemplary embodiment of the invention. Specifically, FIG. 1 is a side view of a hydraulic excavator 1, FIG. 2 is a rear view of the hydraulic excavator 1, and FIG. 3 is a plan view of the hydraulic excavator 1.

The hydraulic excavator 1 is a large-sized work machine used in a working site such as a mine and includes an undercarriage 2, an upper revolving body 3, working equipment 4, and a cab 5. It should be noted that, in a description hereinafter, a portion on which the working equipment 4 is provided in the upper revolving body 3 is defined as a front portion, an opposite portion from the front portion with respect to a revolution center O is defined as a rear portion, and a left side surface and a right side surface are defined with reference to the front and rear portions.

The undercarriage 2 includes: a steel frame 21; and a pair of traveling units 22 provided to side surfaces of the steel frame 21.

Each of the traveling units 22 includes: a driving wheel 23 rotatably provided to a rear end of the steel frame 21 in a travel direction; an idle wheel 24 provided to a front end of the steel frame 21 in the travel direction; and a crawler belt 25 wound around the driving wheel 23 and the idle wheel 24. A plurality of lower and upper rollers (not shown) are rotatably provided to the steel frame 21 between the driving wheel 23 and the idle wheel 24 to support the crawler belt 25.

The upper revolving body 3 is provided on the undercarriage 2 in a revolvable manner and houses an engine (not shown) and a hydraulic circuit (not shown) such as a hydraulic pump configured to be driven by the engine. A counterweight 31 is housed at a rear end of the upper revolving body 3 with respect to the revolution center. A power unit container 30 is mounted at a rear portion of the upper revolving body 3 in front of the counterweight 31. The power unit container 30 houses the engine, a hydraulic pump radiator, an oil cooler and the like.

The upper revolving body 3 includes: a ladder 32 provided to a left side surface of the upper revolving body 3 in a manner to be vertically slidable on the upper revolving body 3; a handrail 33 provided along a periphery of an upper surface of the upper revolving body 3; and a catwalk 34 surrounded by the handrail 33. An operator lowers the ladder 32, climbs up the ladder 32 to the catwalk 34 to walk thereon and gets in the cab 5 from behind.

The working equipment 4 is provided to a front end of the upper revolving body 3 and includes a boom 41, an arm 42, and a bucket 43.

A base of the boom 41 is connected to the upper revolving body 3 in a vertically rotatable manner. The boom 41 is vertically rotatable by a boom cylinder 44 provided to the upper revolving body 3.

A base of the arm 42 is rotatably connected to a distal end of the boom 41. The arm 42 is vertically rotatable by an arm cylinder 45 provided to the boom 41.

A base of the bucket 43 is rotatably connected to a distal end of the arm 42. The bucket 43 is rotated by a bucket cylinder 46 provided to the arm 42.

The cab 5 is provided on a front-left side of an upper surface of the upper revolving body 3 while the working equipment 4 is provided on the front side of the upper revolving body 3. The cab 5 is shaped in a box and includes a glass window 51 formed on each of side surfaces of the box. The operator seated in the cab 5 conducts a digging operation and the like while monitoring outer surroundings through the glass window 51.

However, since the cab 5 is provided at a high position in the hydraulic excavator 1, lower surroundings of the upper revolving body 3 cannot be sufficiently visible.

For this reason, a plurality of cameras 61 to 67 defining a later described surroundings monitor device 6 are provided on an outer circumferential surface of the upper revolving body 3. Specifically, the left-front view camera 61 is provided on a top-front-left side of the upper revolving body 3 and the right-front view camera 62 is provided at a top-front-right corner.

Moreover, the anterior left-side view camera 63 and the posterior left-side view camera 64 are provided on the left side of the upper revolving body 3 and the right-side view camera 65 is provided on a rear-right side of the upper revolving body 3. The posterior left-side view camera 64 is provided to a side of the upper revolving body 3 closer to a rear end with respect to the revolution center O.

Further, the back view camera 66 is provided at a top-rear center of the upper revolving body 3 and a downward view camera 67 is provided to a lower surface of the power unit container 30 positioned at the rear end of the upper revolving body 3.

The cameras 61 to 66 employ, for instance, a wide angle lens. Since imaging ranges of adjacent one of the cameras 61 to 66 overlap with each other, a 360-degree image of nearby surroundings of the hydraulic excavator 1 can be taken. The cameras 61 and 62 are configured to take images under the working equipment 4.

The downward view camera 67 employs, for instance, a wide angle lens and is configured to take an image of a rear portion of the upper revolving body, examples of the rear portion being a lower portion and lower-rear portion of each of the power unit container 30 and the counterweight 31.

Although not shown in FIGS. 1 to 3, a surroundings monitor radar is provided to each of side surfaces of the upper revolving body 3. When the hydraulic excavator 1 approaches an obstacle, the operator is notified of an alarm via buzzer and the like provided in the cab 5. Specifically, as the surroundings monitor radar, one surroundings monitor radar for each of the front surface and the rear surface of the upper revolving body 3 and three surroundings monitor radars for each of the side surfaces of the upper revolving body 3 are provided.

[2] Internal Structure of Cab 5

Figure 4:
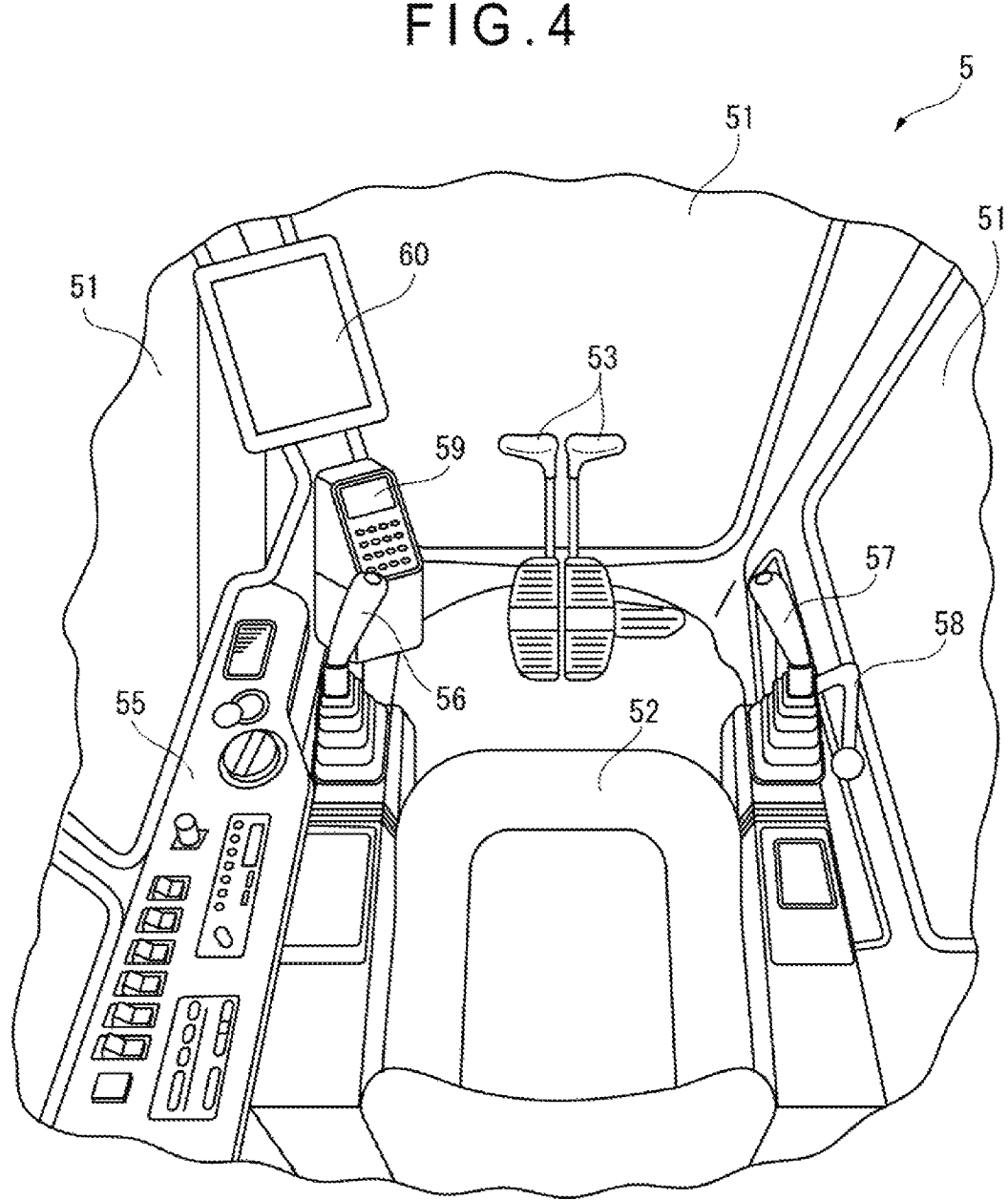
FIG. 4 is a front view of an internal structure of a cab of the work machine including the upper revolving body according to the above exemplary embodiment.

FIG. 4 shows an internal structure of the cab 5. A seat 52 is provided at the center of the cab 5. A pair of travel levers 53 are provided in front of the seat 52.

An operation switch panel 55 for conducting, for instance, adjustment of an engine speed is provided on the left side of the seat 52.

A left operation lever 56 and a right operation lever 57 are respectively provided on the left and right sides of the seat 52. The left operation lever 56 works for rotating the upper revolving body and operating the arm 42. Specifically, when the left operation lever 56 is moved leftward and rightward, the upper revolving body 3 is rotated in a left-right direction. When the left operation lever 56 is moved upward and downward in the figure, the arm 42 is rotated in a front-back direction. The right operation lever 57 works for operating the boom 41 and operating the bucket 43. Specifically, when the right operation lever 57 is moved leftward and rightward, the bucket 43 is rotated in a direction for digging and dumping. When the right operation lever 57 is moved upward and downward in the figure, the boom 41 is rotated in a top-bottom direction. It should be noted that a combination of the movements of the operation levers 56, 57 and which working equipment is operated is not limited to the above exemplary combination in the exemplary embodiment.

Moreover, a lock lever 58 is further provided on the right side of the right operation lever 57. When the lock lever 58 is operated, a flow path of a hydraulic circuit of a hydraulic pump is blocked to stop the movement of the working equipment 4.

A monitor 59 is provided on a front-left side of the seat 52. The monitor 59 displays various working conditions of the hydraulic excavator 1 such as an engine water temperature, a hydraulic fluid temperature of the hydraulic circuit, and a residual amount of a fuel oil.

A touch panel display 60 (a display unit) is provided on the monitor 59. This touch panel display 60 has a region in which the images taken by the above-mentioned cameras 61 to 67 are displayed and a region in which an overview image generated by synthesizing the images taken by all the cameras 61 to 67 is displayed.

[3] Arrangement of Surroundings Monitoring Device 6

Figure 5:
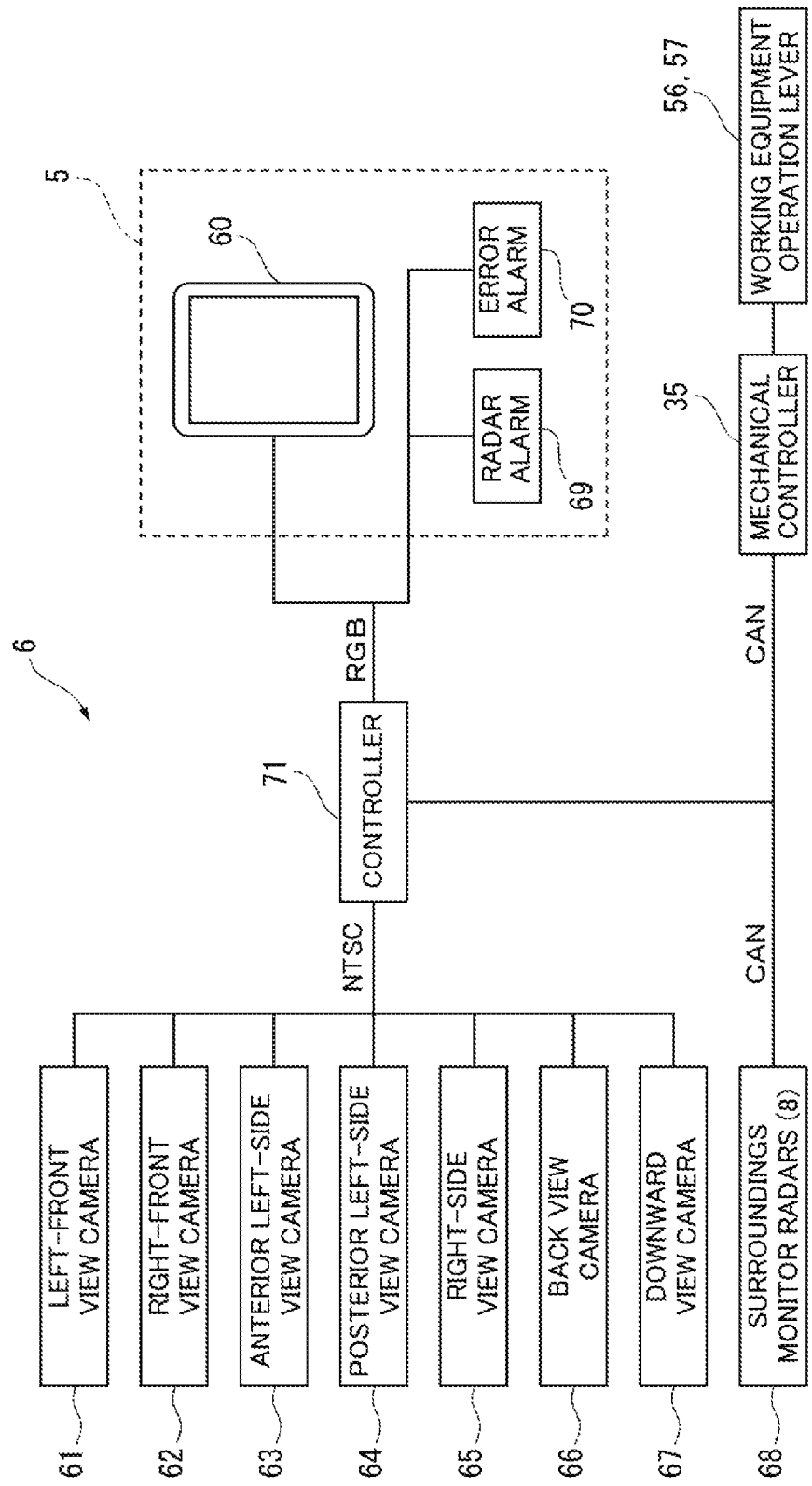
FIG. 5 is a block diagram showing a structure of a surroundings monitor device according to the above exemplary embodiment.

FIG. 5 shows a block diagram of the surroundings monitoring device 6 according to the exemplary embodiment. The surroundings monitor device 6 includes the above-mentioned touch panel display 60, the cameras 61 to 67, eight surroundings monitor radars 68, a radar alarm 69, an error alarm 70, and a controller 71.

An image signal of the images taken by the cameras 61 to 67 are inputted to the controller 71 as an image signal in an NTSC format.

Moreover, sensor signals from the engine and a mechanical controller 35 configured to control the hydraulic circuit are inputted to the controller 71 via CAN (Controller Area Network). The mechanical controller 35 is configured to output to the controller 71 sensor signals of the engine water temperature, the hydraulic fluid temperature and the like detected by temperature sensors and a sensor signal of a pump pressure detected by a pressure sensor. Moreover, the mechanical controller 35 is configured to detect, by the pressure sensor, PPC (Pressure Proportional Control) pressure (pilot pressure) according to an inclined state of each of the left operation lever 56 and the right operation lever 57 for operating the working equipment and rotating the upper revolving body, and to output the detected sensor signals to the controller 71 via the CAN.

Further, the sensor signals detected by the surroundings monitor radars 68 provided on an outer circumferential surface of the upper revolving body 3 are inputted to the controller 71 via the CAN.

The controller 71 is configured to output an image signal in an RGB format to the touch panel display 60 based on the image signals taken by the cameras 61 to 67, various sensor signals inputted from the mechanical controller 35 and the sensor signals inputted from the surroundings monitor radars 68, and to display various information on the touch panel display 60.

Moreover, the controller 71 is configured to control the radar alarm 69 based on the sensor signals detected by the surroundings monitor radars 68 to activate the radar alarm 69 when an obstacle is found. Further, the controller 71 is configured to control the error alarm 70 based on the sensor signals from the engine, the hydraulic circuit and the like via the mechanical controller 35 to activate the error alarm 70 when an error signal is detected.

With these operations, the controller 71 can notify the operator seated in the cab 5 of approach of the obstacle and occurrence of abnormal incident in the engine, the hydraulic circuit and the like to draw his attention.

Figure 6:
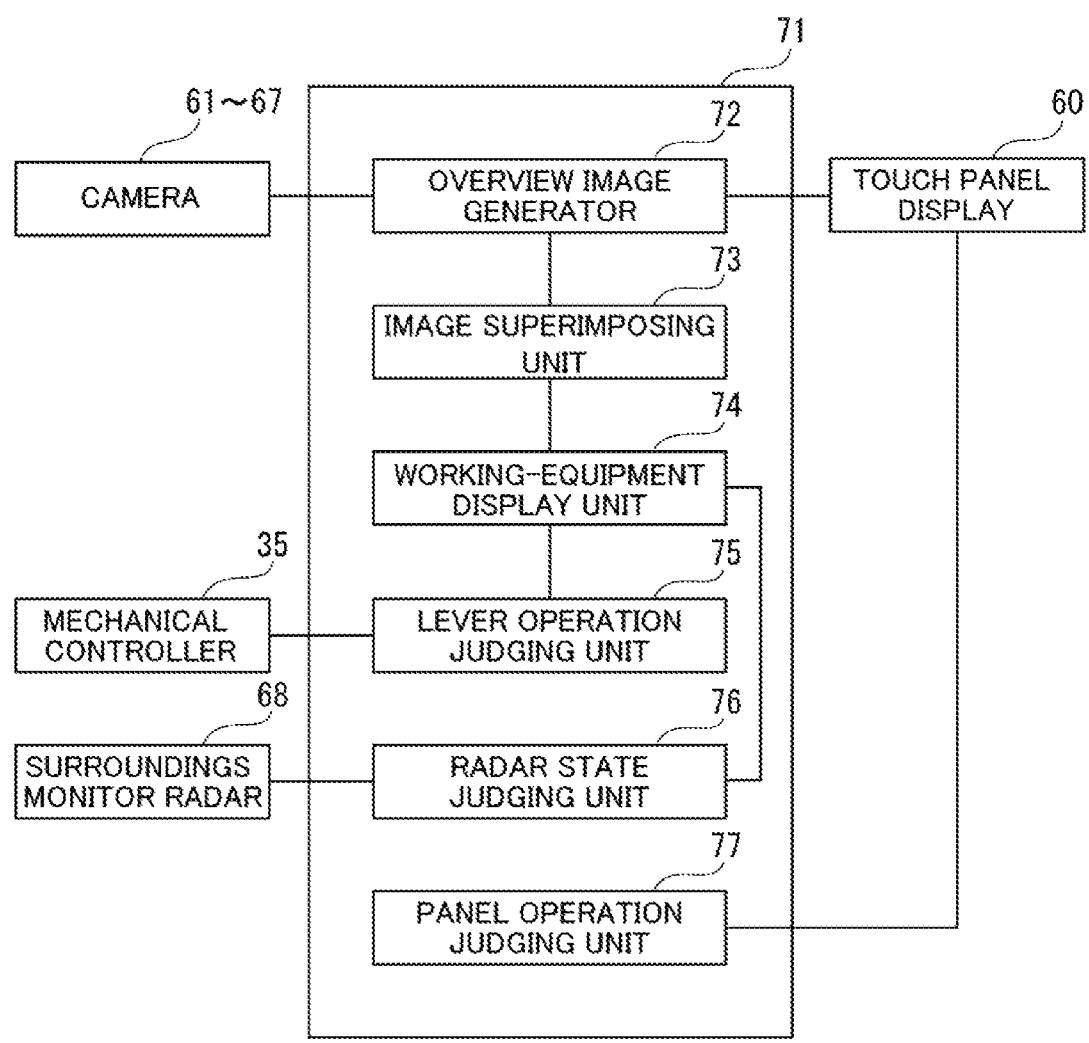
FIG. 6 is a block diagram showing a structure of the surroundings monitor device according to the above exemplary embodiment.

FIG. 6 shows a functional block diagram of the aforementioned controller 71.

The controller 71 includes an overview image generator 72, an image superimposing unit 73, a working-equipment display unit 74, a lever operation judging unit 75 (an operation judging unit), a radar state judging unit 76, and a panel operation judging unit 77.

The overview image generator 72 is configured to generate an overview image of surroundings of the hydraulic excavator 1 based on the images taken by the cameras 61 to 67. Specifically, the overview image generator 72 conducts coordinate conversion of an image data using conversion information stored in a storage (not shown) of the controller 71. The conversion information shows correspondence of positional coordinates of each pixel of the inputted images and positional coordinates of each pixel of the outputted images.

Herein, the inputted images mean the images taken by the cameras 61 to 67. The outputted images mean the overview image displayed on the touch panel display 60.

The overview image generator 72 is configured to convert each image taken by the cameras 61 to 67 to a top view image seen from a predetermined imaginary view point positioned over the hydraulic excavator 1, using the conversion information.

Figure 7:
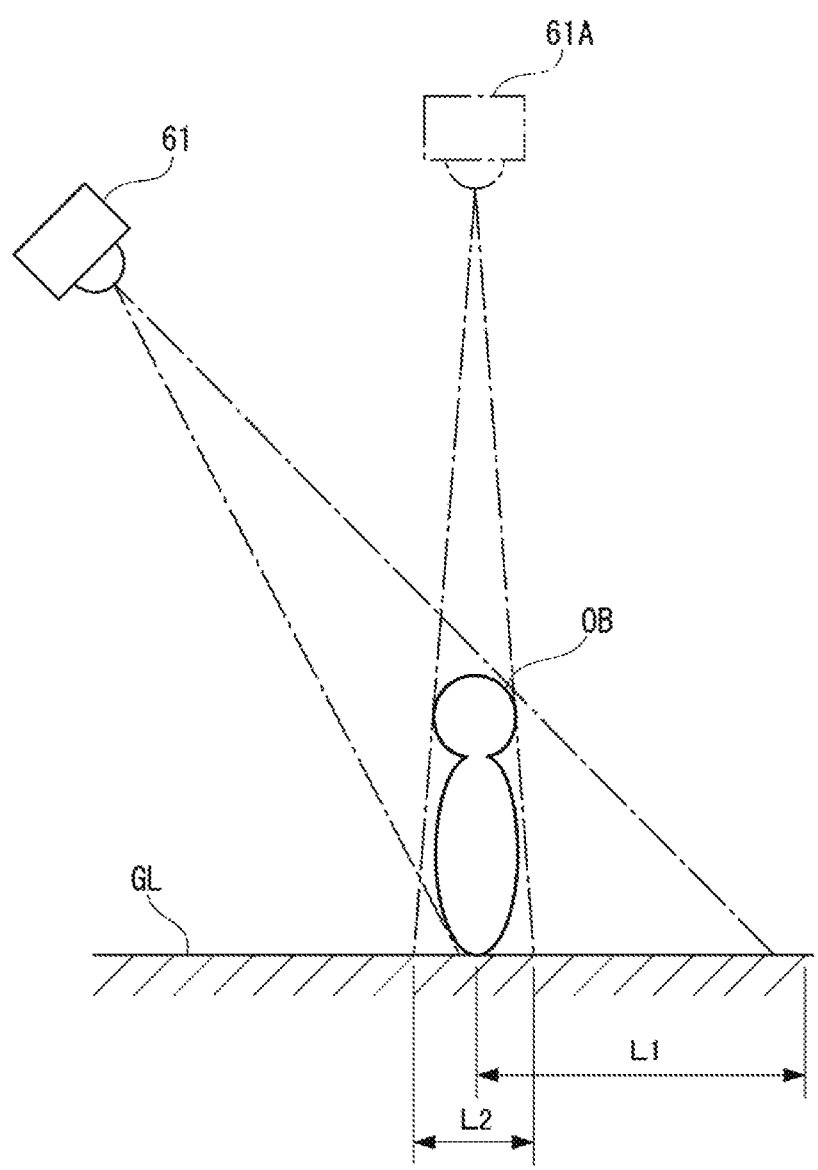
FIG. 7 is a schematic illustration for describing generation of an overview image in the above exemplary embodiment.

Specifically, as shown in FIG. 7, the image taken by the camera 61 is projected on a predetermined imaginary projection surface GL, thereby being converted to an image seen from an imaginary view point 61A positioned above the hydraulic excavator 1. The conversion information is in terms of the imaginary projection surface GL. For instance, a dimension L1 of a target OB whose image is taken from obliquely above by the camera 61 is converted to a dimension L2 on the imaginary projection surface GL.

After projecting the image data taken by the six cameras 61 to 67 on the predetermined imaginary projection surface GL to be converted to the respective top view images, the overview image generator 72 synthesizes the converted image data to generate a single overview image of surroundings of the hydraulic excavator 1.

The overview image generator 72 also synthesizes the image taken by the downward view camera 67 as an image beneath the rear portion of the upper revolving body 3 with the generated overview image.

Figure 8:
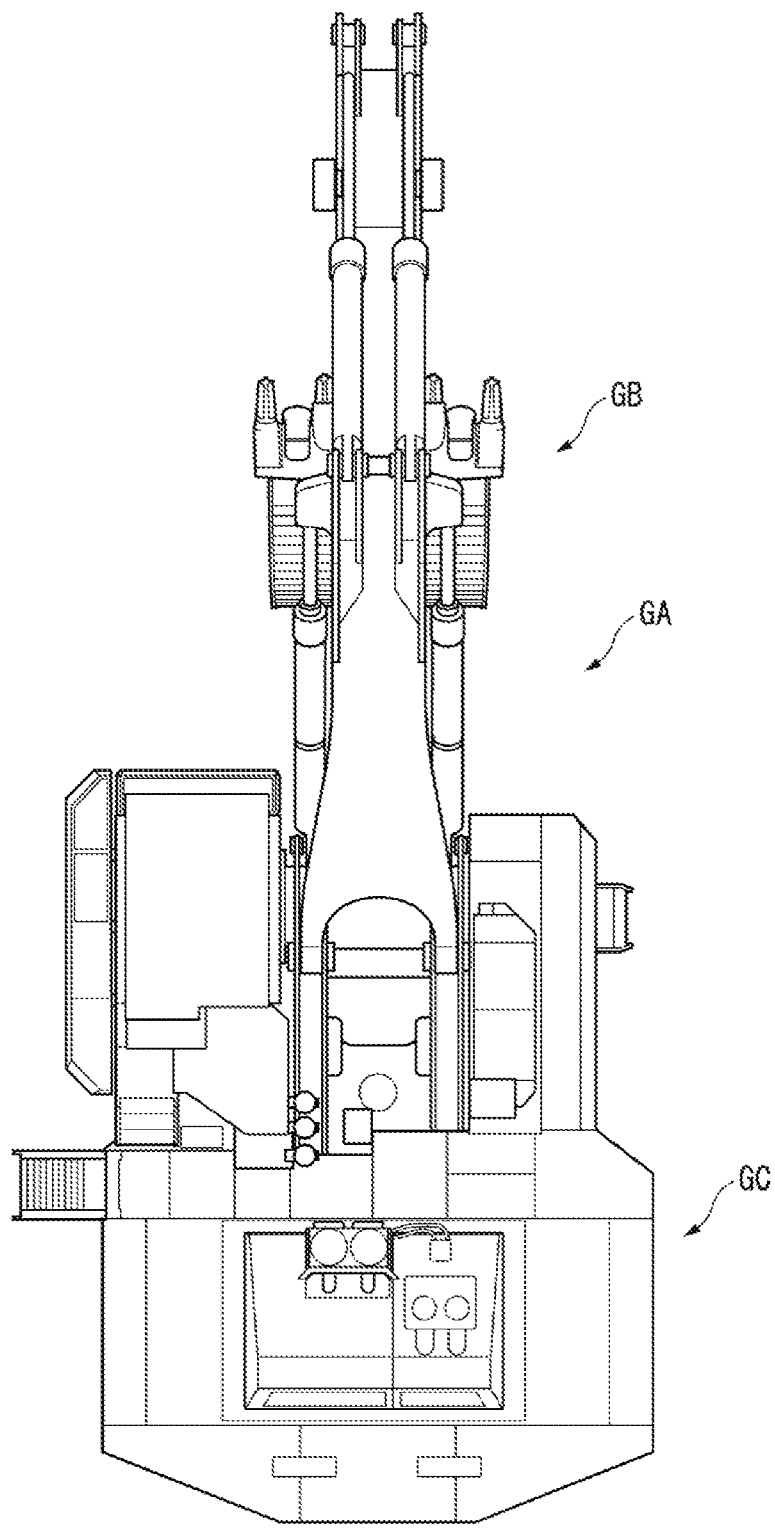
FIG. 8 is a schematic illustration of the work machine superimposed with a top view image thereof by an image superimposing unit in the above exemplary embodiment.

The image superimposing unit 73 includes a storage in which a top view image GA as shown in FIG. 8 of the hydraulic excavator 1 is stored. The image superimposing unit 73 is configured to superimpose the top view image GA at the center of the overview image generated by the overview image generator 72 and display the superimposed overview image on the touch panel display 60.

The working-equipment display unit 74 is configured to display or not display a partial image (i.e., an image of the working equipment) of the top view image GA of the hydraulic excavator 1 according to a switching operation of the touch panel display 60 and/or the operation condition of the operation levers 56, 57 of the working equipment 4.

Figure 9:
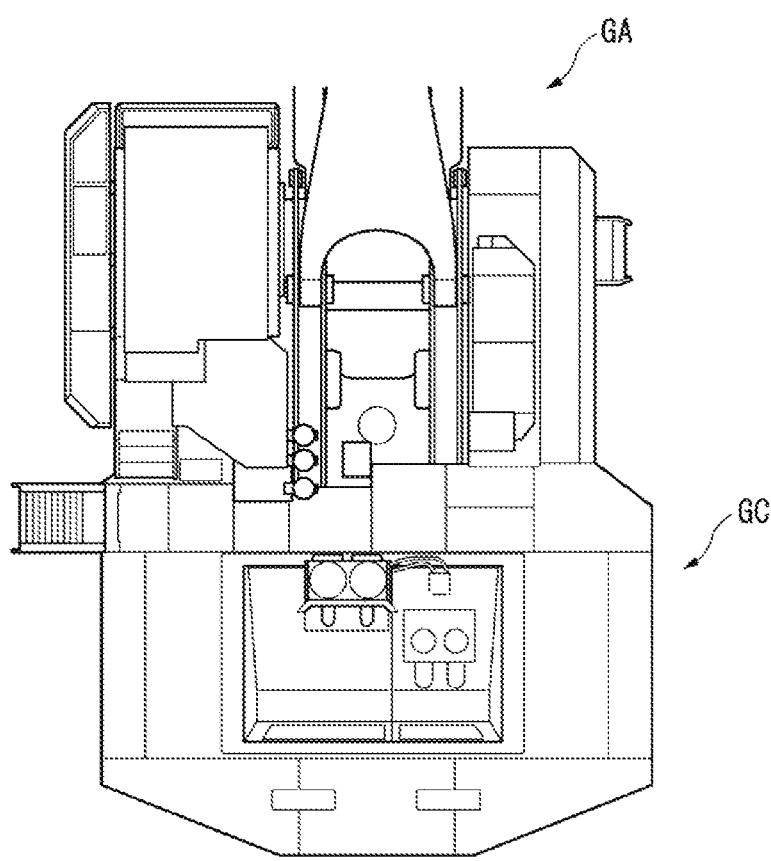
FIG. 9 is a schematic illustration of the top view image of the work machine in which working equipment is put in a non-display state by a working-equipment display unit in the above exemplary embodiment.

Specifically, the working-equipment display unit 74 completely puts a partial image GB (see FIG. 8) of the working equipment in a non-display state, as shown in FIG. 9. A boundary between the display region and the non-display region of the working equipment shown in FIG. 9 is exemplarily defined so that a region protruding from a front end of the upper revolving body is put in a non-display state. However, the non-display region may be determined in a different manner.

Figure 10:
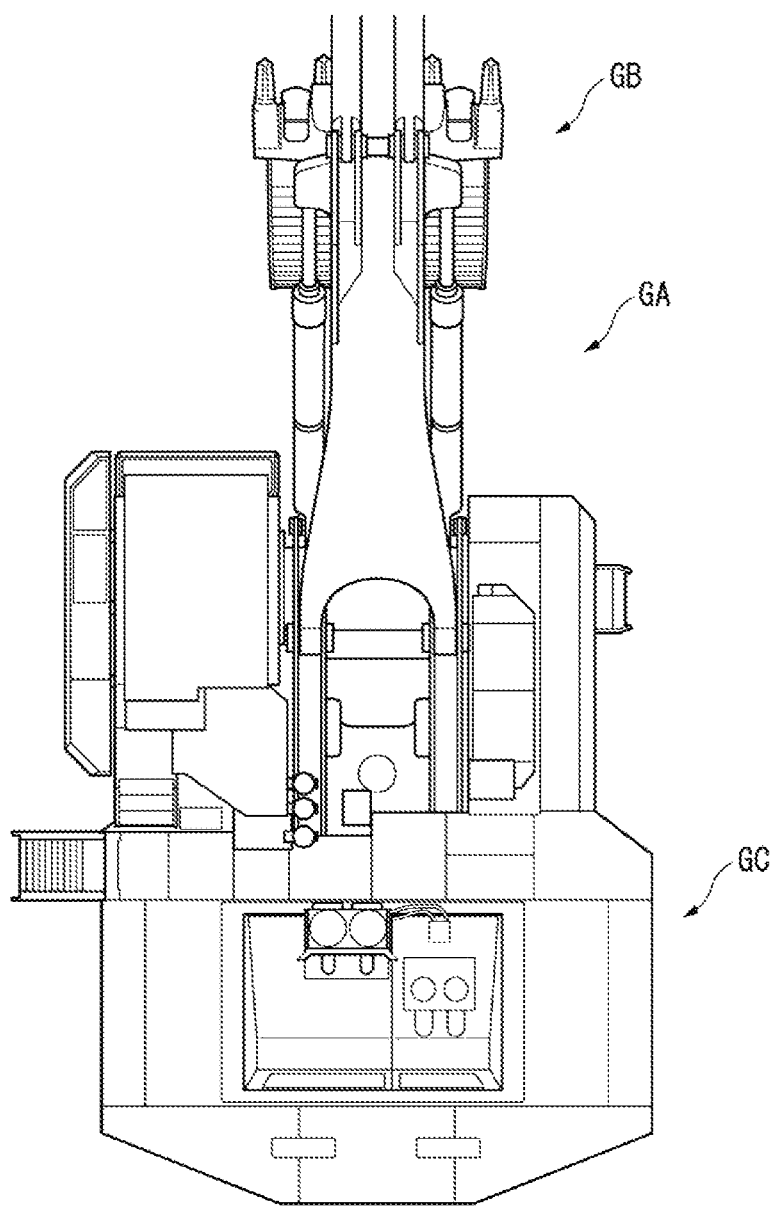
FIG. 10 is a schematic illustration of the top view image of the work machine in which a part of the working equipment is put in a non-display state by the working-equipment display unit in the above exemplary embodiment.
Figure 11:
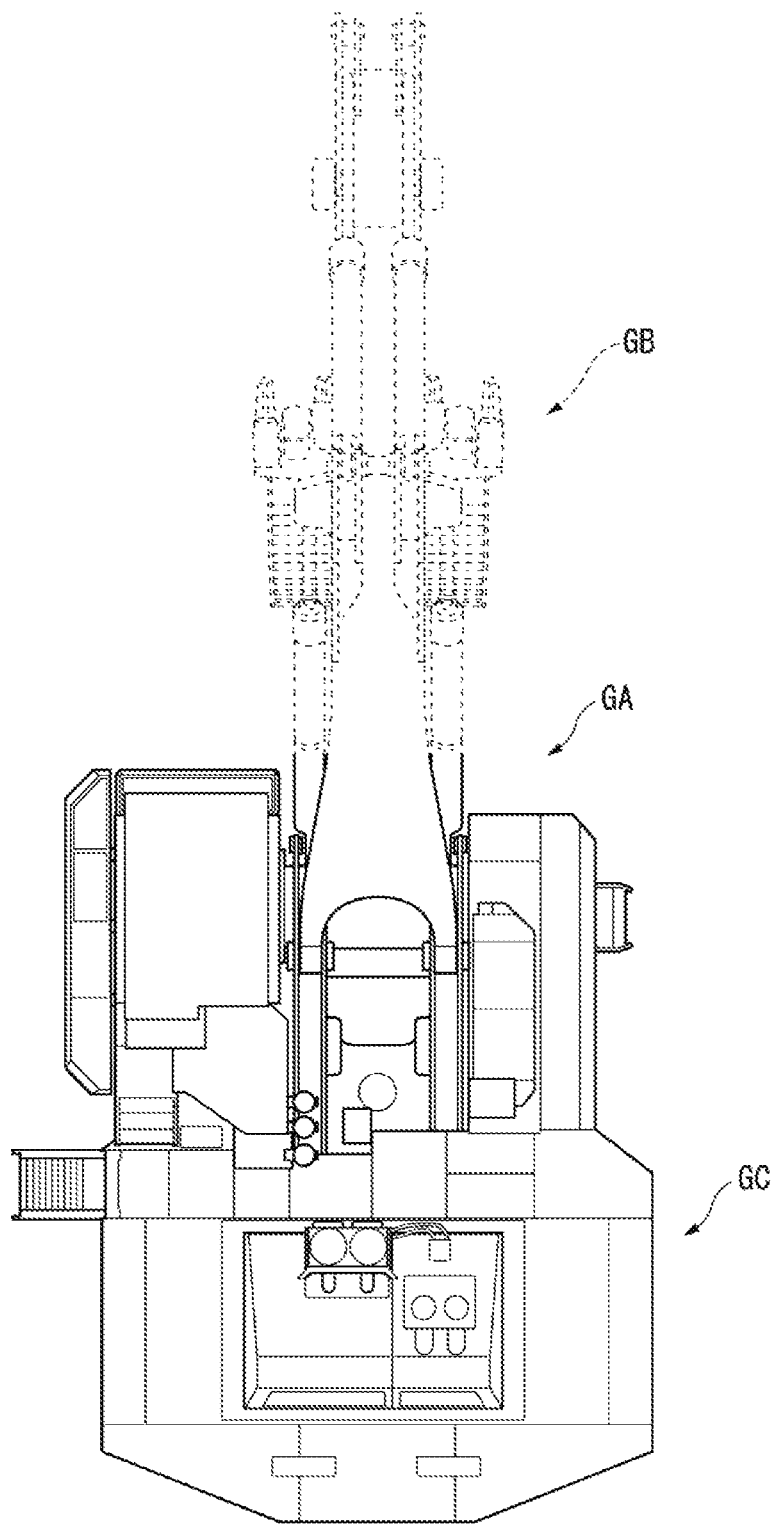
FIG. 11 is a schematic illustration of the top view image of the work machine in which the working equipment is transparently displayed by the working-equipment display unit in the above exemplary embodiment.

The operation of the working-equipment display unit 74 is not limited to the above. The working-equipment display unit 74 may put a part of the working equipment from the partial image GB in a non-display state as shown in FIG. 10, or may display the partial image GB of the working equipment in a semitransparent manner as shown in FIG. 11. With such displays, a relationship between the overview image and a direction of the upper revolving body 3 can be easily recognized.

The working-equipment display unit 74 may perform a display processing or a non-display processing of the rear portion of the upper revolving body 3 in the top view image of the hydraulic excavator 1 according to the switching operation of the touch panel display 60 and the operation condition of the operation levers 56, 57 of the working equipment 4.

Figure 12:
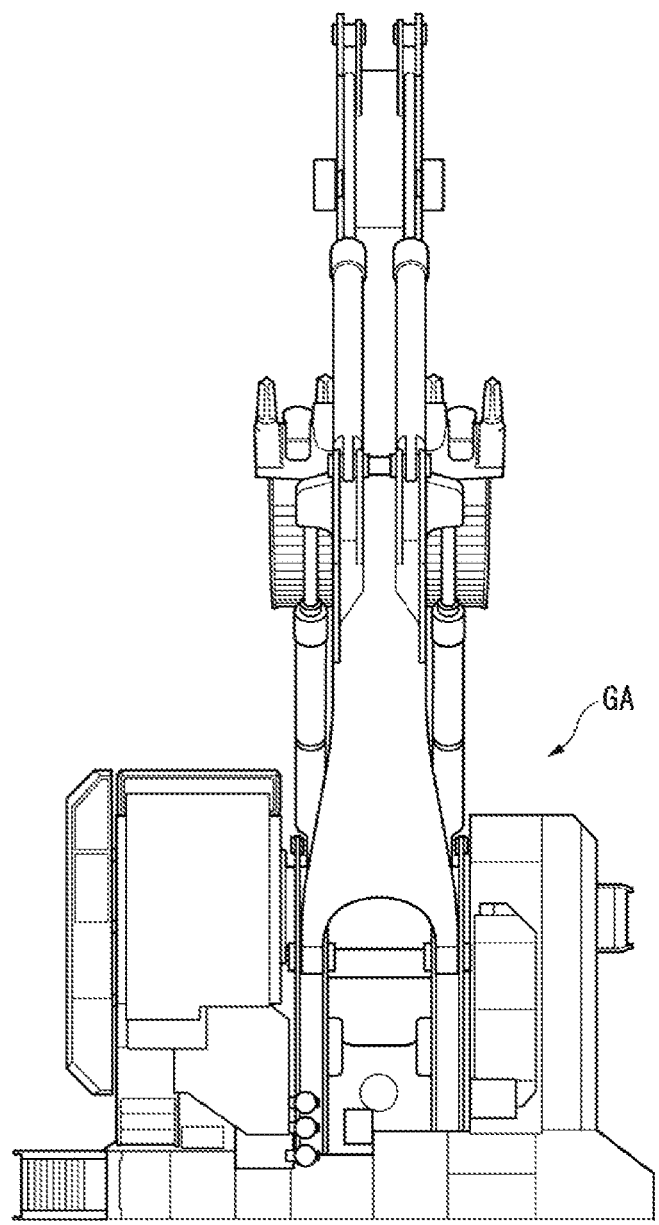
FIG. 12 is a schematic illustration of the top view image of the work machine in which a counterweight is put in a non-display state by a counterweight display unit in the above exemplary embodiment.

Specifically, the working-equipment display unit 74 puts a partial image GC (see FIG. 8) of the rear portion of the upper revolving body 3 in a non-display state, as shown in FIG. 12. Although not shown in the figure, the partial image GC may be put in a partial non-display state or displayed in a semitransparent manner in the same manner as the partial image processing of the working equipment 4.

Although the rear portion of the upper revolving body 3 is exemplarily shown, a region other than the rear portion in a main body of the work machine, or the entire region of a main body of the hydraulic excavator 1 may be put in a non-display state or displayed in a transparent manner.

The lever operation judging unit 75 is configured to judge whether the working equipment 4 is operated based on the PPC pressures of the operation levers 56, 57 outputted from the mechanical controller 35, and to output judgment results to the working-equipment display unit 74. The lever operation judging unit 75 is configured to also judge the operation condition of the travel lever 53, specifically, whether or not the hydraulic excavator 1 is travelling in response to the operation of the travel lever 53, and to output a judgment result to the working-equipment display unit 74.

The radar state judging unit 76 is configured to judge using the surroundings monitor radars 68 whether the hydraulic excavator 1 approaches an obstacle. When the radar state judging unit 76 detects approach of the obstacle, the surroundings monitor radars 68 output signals to the working-equipment display unit 74, whereby a partial region of the working equipment or the main body of the hydraulic excavator 1 which are positioned near the obstacle may be put in a non-display state or displayed in a transparent manner.

The panel operation judging unit 77 judges whether to put the partial image GB of the working equipment and the partial image GC of the rear portion of the upper revolving body 3 in a non-display state by the operator touching a switch displayed on the touch panel display 60, and outputs judgment results to the working-equipment display unit 74.

Figure 13:
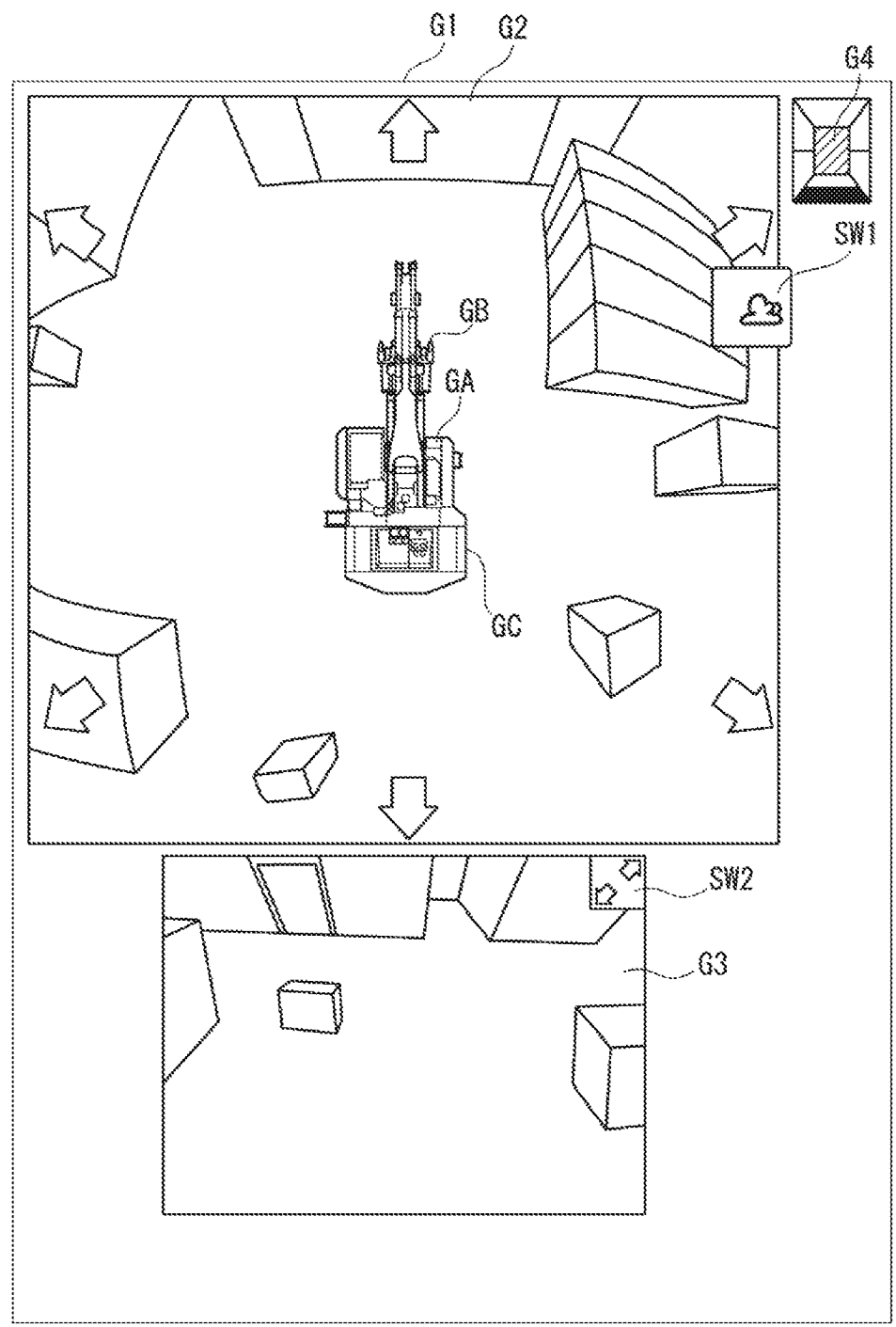
FIG. 13 is a schematic illustration of an image displayed by a display unit of the surroundings monitor unit in the above exemplary embodiment.

FIG. 13 shows a display image G1 displayed on the touch panel display 60. The display image G1 includes: an overview image G2 generated by the overview image generator 72; a single-camera image G3 taken by one of the cameras 61 to 67; and a display position image G4 showing which one of the cameras 61 to 67 has taken the single-camera image. An operation of a switch SW1 can switch the partial image GB of the working equipment and the partial image GC of the rear portion of the upper revolving body 3 between display and non-display. As an example, by operating the switch SW1, (1) the partial image GB of the working equipment and the partial image GC of the rear portion of the upper revolving body being both in a display state, (2) only the partial image GC of the rear portion of the upper revolving body being in a non-display state, (3) only the partial image GB of the working equipment being in a non-display state, and (4) the partial image GB of the working equipment and the partial image GC of the rear portion of the upper revolving body being both in a non-display state can be cyclically switched.

The overview image G2 is provided by superimposing the top view image GA of the hydraulic excavator 1 on the overview image generated by the overview image generator 72.

The single-camera image G3 displays the image taken by one of the cameras 61 to 67. A display of a switch SW2 is superimposed at a corner of the single-camera image G3. When the operator touches the switch SW2, the overview image G2 is reduced in size while the single-camera image G3 is enlarged.

The display position image G4 indicates which one of the cameras 61 to 67 has taken the image displayed on the single-camera image G3. Specifically, a quadrangle in the middle of the display position image G4 represents the hydraulic excavator and a position of the one of the cameras 61 to 67 whose image has been displayed on the single-camera image G3 is displayed in color. With such a display, the operator can recognize which one of the cameras 61 to 67 whose image is currently displayed.

[4] Operations and Advantages of Embodiment(s)

Figure 14:
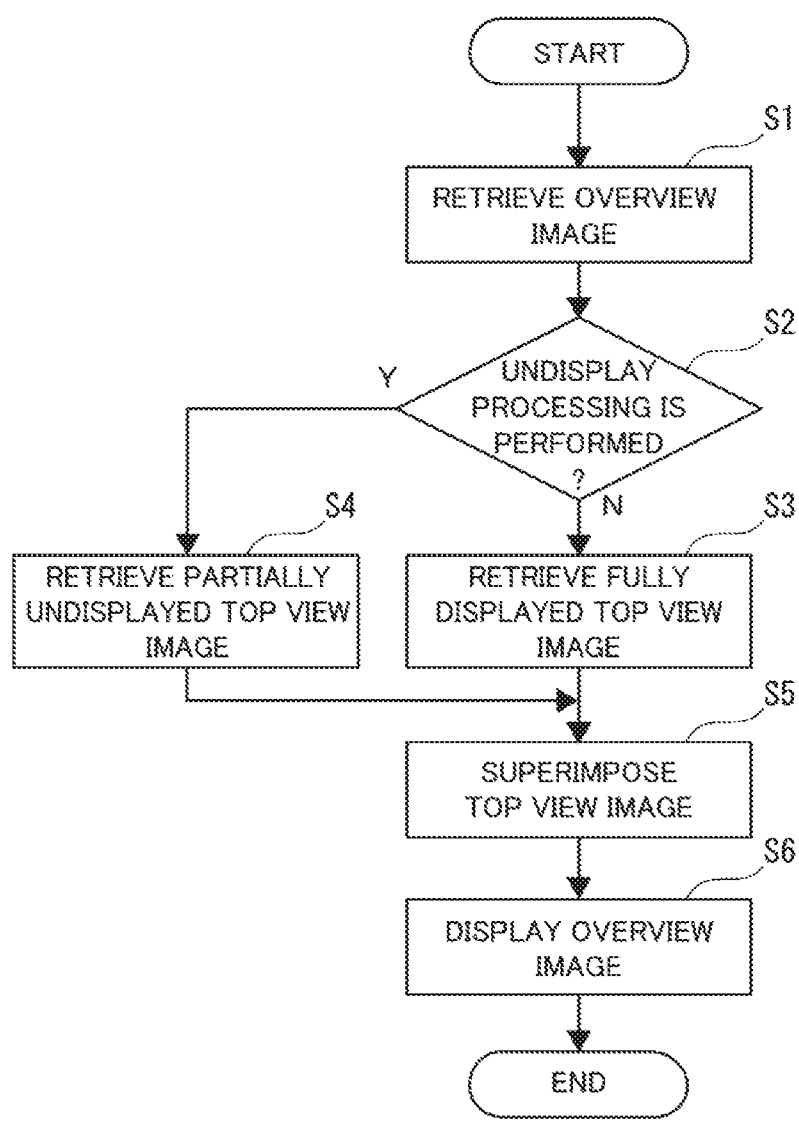
FIG. 14 is a flowchart for describing operations in the above exemplary embodiment.

Next, operations in the exemplary embodiments will be described with reference to the flowchart shown in FIG. 14.

Firstly, the overview image generator 72 generates the overview image G2 according to the above-described procedure based on the image data taken by the cameras 61 to 67 (Step S1).

Next, during the display of the overview image G2 on the touch panel display 60, the working-equipment display unit 74 monitors, for instance, whether the working equipment 4 has been operated, whether an obstacle has been detected, and whether the switch SW1 of the touch panel display 60 has been operated, and judges whether to perform a non-display processing (Step S2).

When the non-display processing is judged to be unnecessary, the working-equipment display unit 74 retrieves the top view image GA of the work machine and the entire working equipment as shown in FIG. 8 and transmits the top view image GA to the image superimposing unit 73 (Step S3).

On the other hand, when the non-display processing is judged to be necessary because the operation of the working equipment 4 is detected by the lever operation judging unit 75, an obstacle is detected by the radar state judging unit 76, or the operation of the switch SW1 of the touch panel display 60 is detected by the panel operation judging unit 77, the working-equipment display unit 74 retrieves the top view image GA in which the partial image GB of the working equipment and/or the partial image GC of the rear portion of the upper revolving body 3 are put in a non-display state, and transmits the retrieved top view image GA to the image superimposing unit 73 (Step S4).

Next, the image superimposing unit 73 superimposes the top view image GA on the overview image generated by the working-equipment display unit 74 (Step S5).

Figure 15:
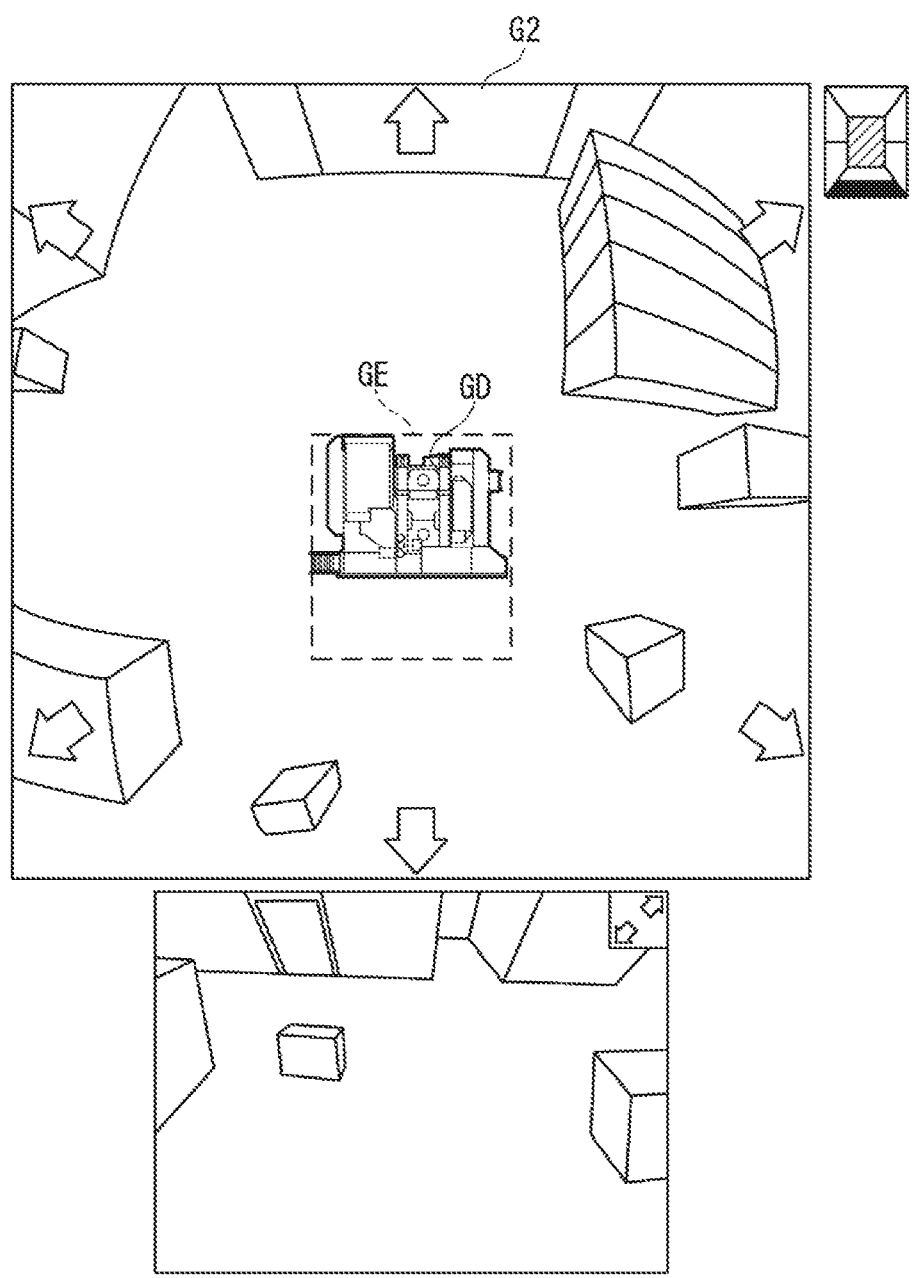
FIG. 15 is a schematic illustration of an image subjected to a working-equipment display processing and a counterweight display processing in the above exemplary embodiment.

The overview image generator 72 displays the image superimposed with the top view image GA on the touch panel display 60 as the overview image G2 (Step S6). For instance, when the working equipment and the rear portion of the upper revolving body 3 are put in a non-display state, as shown in FIG. 15, the top view image GD of the hydraulic excavator 1, in which the partial image GB of the working equipment 4 and the partial image GC of the rear portion of the upper revolving body 3 are put in a non-display state, is superimposed on the overview image G2 generated by the overview image generator 72, and the obtained image is displayed on the touch panel display 60. FIG. 15 shows both of the partial image GB of the working equipment 4 and the partial image GC of the rear portion of the upper revolving body in a non-display state. However, the touch panel display 60 can display with either only the partial image GB of the working equipment 4 in a non-display state or only the partial image GC of the rear portion of the upper revolving body in a non-display state.

Alternatively, as shown in FIG. 15, an outline GE showing a periphery of the main body of the hydraulic excavator 1 and an outline GF showing a periphery of the working equipment may be displayed on the overview image G2. Even when the direction of the upper revolving body is difficult to determine due to non-display of the partial image GB of the working equipment 4 and/or the rear portion of the upper revolving body, thus displaying the outlines makes it easy to recognize the direction of the upper revolving body and the position of the hydraulic excavator on the overview image.

According to the above exemplary embodiment, the following advantages are obtained.

Since the working-equipment display unit 74 is provided, the partial image GB of the working equipment 4 and the partial image GC of the rear portion of the upper revolving body 3 can be put in a non-display state on the top view image GA. Accordingly, the region under the working equipment 4 and a region under the rear portion of the upper revolving body 3 can be displayed on the overview image G2, so that the operator can easily recognize an obstacle and the like at the lower portion of the working equipment 4 and the lower portion in the rear portion of the upper revolving body 3.

Moreover, since the working equipment 4 and the rear portion of the upper revolving body 3 can be displayed on the overview image G2 by disabling the working-equipment display unit 74, the operator can easily recognize a direction in which the working equipment 4 works.

Since the lever operation judging unit 75 is provided, when the operator operates the working equipment 4 using the operation levers 56, 57, the operator can safely operate the working equipment 4 while checking a condition of the region under the working equipment 4 since at least the working equipment 4 can be put in a non-display state on the top view image GA. Since the radar state judging unit 76 is provided, even when an obstacle approaches, the obstacle can be surely found since the working equipment and a partial region of the main body of the work machine near the obstacle can be put in a non-display state.

[5] Modification(s) of Embodiment(s)

It should be understood that the scope of the invention is not limited to the above-described exemplary embodiment(s) but includes modifications and improvements as long as the modifications and improvements are compatible with the invention.

In the above exemplary embodiment, the touch panel display 60 is provided as the display unit in addition to the monitor 59. However, the display unit of the invention is not limited thereto. The overview image G2 may be displayed on the monitor 59. Moreover, the touch panel display 60 may be replaced by a typical display in which a touch sensor is not installed.

In the above exemplary embodiment, the overview image G2 and the single-camera image G3 are simultaneously displayed on the touch panel display 60. However, only the overview image G2 may be displayed on the touch panel display 60.

In the above exemplary embodiment, seven cameras 61 to 67 are provided along the outer circumference of the upper revolving body 3. However, the number of the cameras for forming the surroundings monitor device may be smaller than seven, or alternatively, may be larger than seven.

In the above exemplary embodiment, the surroundings monitor device 6 includes the surroundings monitor radars 68 and the cameras 61 to 67 in cooperation with each other. However, the cameras 61 to 67 alone may serve as the surroundings monitor device.

Although the region to be put in a non-display is exemplified by the rear portion of the upper revolving body 3 in addition to the working equipment 4 in the above exemplary embodiment, a region other than the rear portion in a main body of the work machine, or the entire region of a main body of the hydraulic excavator 1 may be put in a non-display state or displayed in a transparent manner.

Moreover, although a rotational movement of the upper revolving body 3 is determined in response to an operational signal from the levers in the above exemplary embodiment, the rotational movement may be determined by the other methods such as detection of change in a hydraulic pressure in association with the rotational movement.

Further, although the sensor signals and the like from the mechanical controller 35 are inputted to the controller 71 via CAN in the above exemplary embodiment, the sensor signals may be inputted by the other units.

Although the invention is used in the hydraulic excavator 1 in the above exemplary embodiment, the invention may be used in the other work machines such as a wheel loader and a bulldozer.

In the above exemplary embodiment, the touch panel display 60 is provided in the cab 5 of the hydraulic excavator 1. However, the touch panel display 60 may be provided at the other positions.

The touch panel display 60 may be provided at the other positions such as the remote control seat 100 for performing a remote control of the hydraulic excavator 1 and a control room for managing and controlling an entirety of a plurality of work machines in mines. The touch panel display 60 may display images of the surroundings monitor device thereon.

Figure 16:
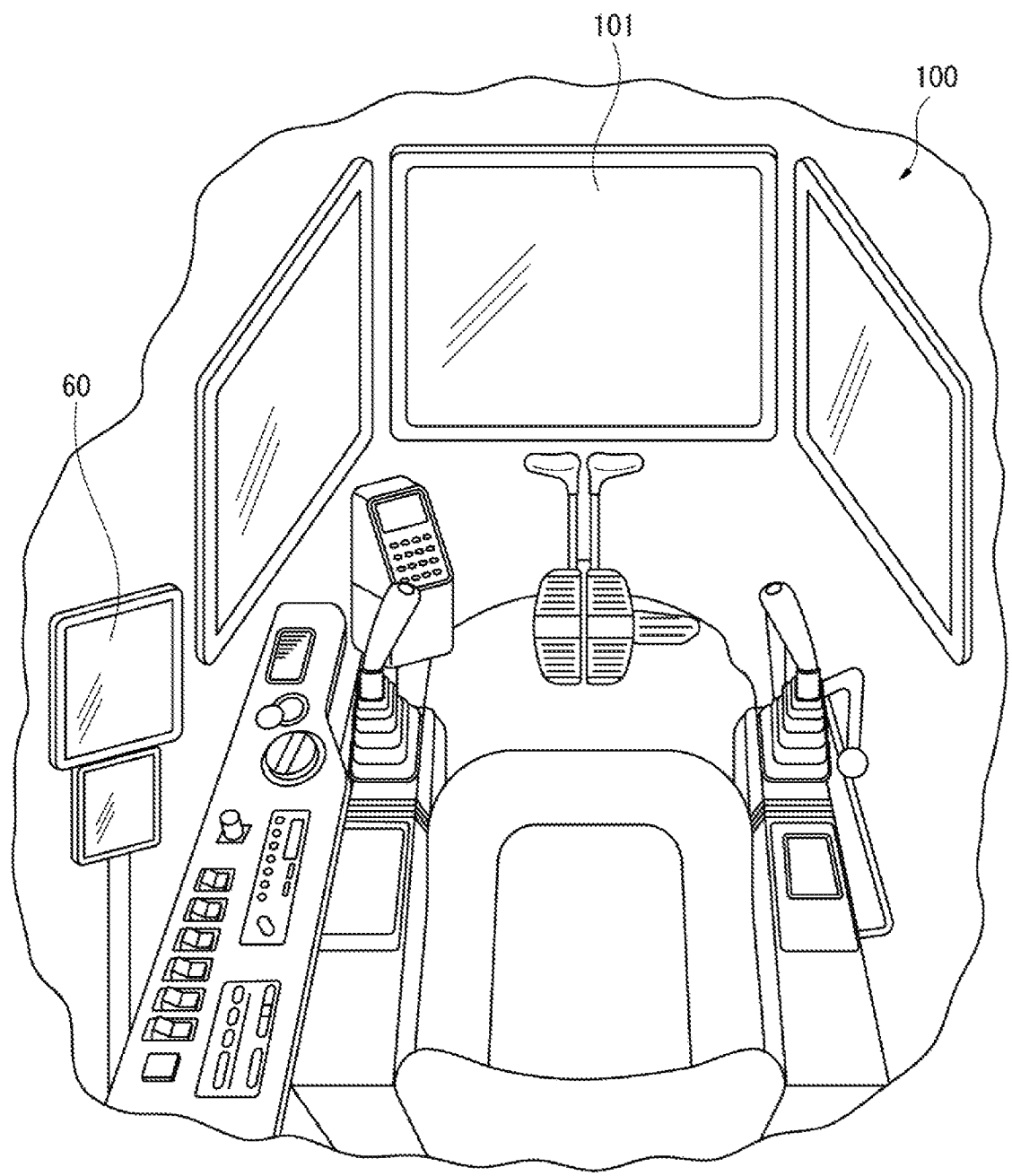
FIG. 16 is a front view of a structure of a remote control seat in a modification of the above exemplary embodiment.

Further, the remote control monitor 101 shown in FIG. 16 may be used as a display unit configured to display the overview image in the same manner as the touch panel display 60.

Figure 17:
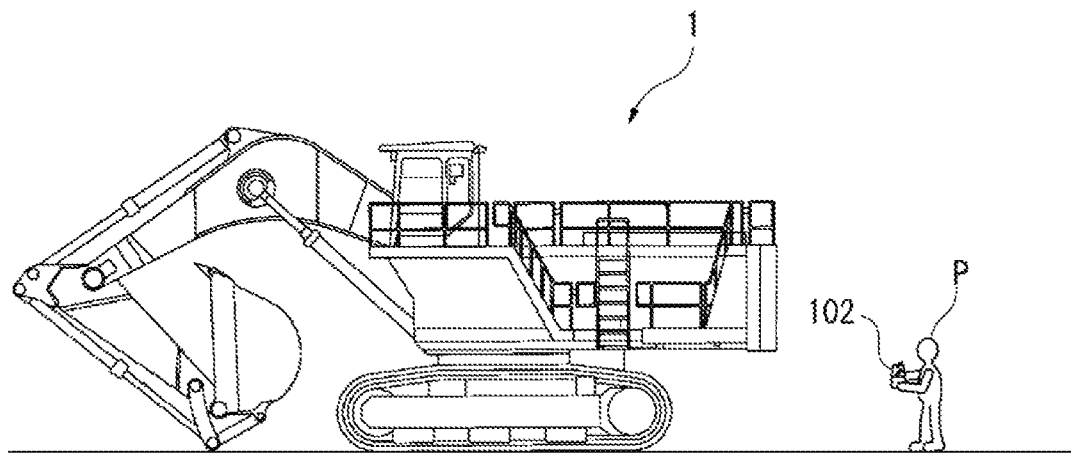
FIG. 17 is a side view illustrating a remote control using a portable terminal in a modification of the above exemplary embodiment.

Further, the touch panel display may be provided in a portable terminal 102 as shown in FIG. 17, so that an operator P can check the overview image displayed on the portable terminal 102.

In this arrangement, when the overview image is displayed on the touch panel display 60 in the remote control seat 100 and the control room or when the touch panel display 60 is provided in the portable terminal 102, any communication unit may be provided to each of the hydraulic excavator 1, the remote control seat 100, the control room, the portable terminal 102 or the like, through which information such as the overview image is transmitted and received.

In addition, other configuration(s) may be employed as long as compatible with an object of the invention.

The invention claimed is:

1. A system comprising:
a plurality of cameras configured to take images of surroundings of a work machine, the work machine comprising an undercarriage, an upper revolving body provided on the undercarriage and configured to revolve relative to the undercarriage, and working equipment comprising a bucket;

a display unit configured to display the images taken by the plurality of cameras; and a controller configured to control the plurality of cameras and the display unit, wherein at least one of the plurality of cameras is capable of taking an image under the working equipment, the controller is further configured to:
  generate an overview image based on the images taken by the plurality of cameras;
  superimpose a top view image of the work machine on the overview image;
  switch the top view image of the work machine between (i) a first state in which the top view image includes the upper revolving body and at least one part of the working equipment and (ii) a second state in which the top view image includes a non-transparent image of the upper revolving body and does not include the at least one part of the working equipment or in which the top view image includes the non-transparent image of the upper revolving body and a transparent image of the at least one part of the working equipment; and
  determine at least one of a movement of the working equipment and a travel movement of the work machine, and wherein the controller is further configured to:
  control the display unit to display the overview image on which the top view image of the work machine is superimposed;
  based on determining that the at least one of the movement of the working equipment and the travel movement of the work machine is performed, switch the top view image of the work machine from the first state to the second state; and
  based on determining that at least one of an operation of the working equipment or a travel operation of the work machine is stopped, set the top view image of the work machine to the first state.

2. The system according to claim 1, wherein
the controller is further configured to display an outline of the working equipment in the top view image of the work machine on the overview image on which the top view image of the work machine is superimposed.

3. The system according to claim 1, wherein
at least one of the plurality of cameras is capable of taking an image under the upper revolving body of the work machine, and
the controller is further configured to display the top view image of the work machine without displaying at least one part of the upper revolving body of the work machine or with transparently displaying the at least one part of the upper revolving body of the work machine, in addition to the at least one part of the working equipment.

4. The system according to claim 1, wherein
the display unit is provided in any one of a remote control seat, a control room, and a portable terminal for a remote control.

5. The system according to claim 1, wherein the controller is further configured to:
determine the movement of the working equipment based on the operation of the working equipment; and
determine the travel movement of the work machine based on the travel operation of the work machine.

6. The system according to claim 1, wherein the controller is configured to, based on the work machine travelling in response to operation of a travel lever, switch the top view image of the work machine from the first state to the second state.

7. The system according to claim 1, wherein the non-transparent image of the upper revolving body comprises solid lines.

8. A system comprising:
a surroundings monitor radar configured to monitor surroundings of a work machine, the work machine comprising a main body and working equipment comprising a bucket;
a plurality of cameras configured to take images of surroundings of the work machine;
a display unit configured to display the images taken by the plurality of cameras; and
a controller configured to control the plurality of cameras and the display unit, wherein
at least one of the plurality of cameras is capable of taking an image under the working equipment or the main body of the work machine,
the controller is configured to:
  generate an overview image based on the images taken by the plurality of cameras;
  superimpose a top view image of the work machine on the overview image;
  switch the top view image of the work machine between (i) a first state in which the top view image includes the main body and at least one part of the working equipment and (ii) a second state in which the top view image includes a non-transparent image of the main body and does not include the at least one part of the working equipment or in which the top view image includes the non-transparent image of the main body and a transparent image of the at least one part of the working equipment, or switch between (iii) a third state in which the top view image includes at least one part of the non-transparent image of the main body of the work machine and (iv) a fourth state in which the top view image does not include the at least one part of the non-transparent image of the main body of the work machine or in which the top view image includes a transparent image of the at least one part of the non-transparent image of the main body of the work machine; and
  determine presence or absence of an obstacle in surroundings of the work machine based on a signal from the surroundings monitor radar, wherein the controller is further configured to:
  control the display unit to display the overview image on which the top view image of the work machine is superimposed;
  based on determining that the obstacle is detected, switch the top view image of the work machine from the first state to the second state or from the third state to the fourth state; and
  based on determining that the obstacle is not detected, set the top view image to the first state or the third state.

9. The system according to claim 8, wherein
the controller is further configured to display an outline of the working equipment in the top view image of the work machine on the overview image on which the top view image of the work machine is superimposed.

10. The system according to claim 8, wherein
the controller is further configured to display the top view image of the work machine without displaying the at least one part of the main body of the work machine or with transparently displaying the at least one part of the main body of the work machine, in addition to the at least one part of the working equipment.

11. The system according to claim 8, wherein
the display unit is provided in any one of a remote control seat, a control room, and a portable terminal for a remote control.

12. A system comprising:
a plurality of cameras configured to take images of surroundings of a work machine, the work machine comprising an undercarriage, an upper revolving body provided on the undercarriage and configured to revolve relative to the undercarriage, and working equipment comprising a bucket;
a display unit configured to display the images taken by the plurality of cameras; and
a controller configured to control the plurality of cameras and the display unit,
wherein the controller is further configured to:
  generate an overview image based on the images taken by the plurality of cameras;
  superimpose a top view image of the work machine on the overview image;
  switch the top view image of the work machine between (i) a first state in which the top view image includes the upper revolving body and at least one part of the working equipment and (ii) a second state in which the top view image includes a non-transparent image of the upper revolving body and does not include the at least one part of the working equipment or in which the top view image includes the non-transparent image of the upper revolving body and a transparent image of the at least one part of the working equipment; and
  determine at least one of a movement of the working equipment and a travel movement of the work machine, and
wherein the controller is further configured to:
  control the display unit to display the overview image on which the top view image of the work machine is superimposed;
  based on determining that the at least one of the movement of the working equipment and the travel movement of the work machine is performed, switch the top view image of the work machine from the first state to the second state; and
  based on determining that at least one of an operation of the working equipment or a travel operation of the work machine is stopped, set the top view image of the work machine to the first state.

13. The system according to claim 12, wherein the display unit is provided in any one of a remote control seat, a control room, and a portable terminal for a remote control.

14. The system according to claim 12, wherein the controller is further configured to:
determine the movement of the working equipment based on the operation of the working equipment; and
determine the travel movement of the work machine based on the travel operation of the work machine.

* * * * *